United States Patent
Stark

(10) Patent No.: US 6,693,670 B1
(45) Date of Patent: Feb. 17, 2004

(54) MULTI-PHOTODETECTOR UNIT CELL

(75) Inventor: Moshe Stark, Even Yehuda (IL)

(73) Assignee: Vision – Sciences, Inc., Natick, MA (US)

( * ) Notice: Subject to any disclaimer, the term of this patent is extended or adjusted under 35 U.S.C. 154(b) by 0 days.

(21) Appl. No.: 09/629,703

(22) Filed: Jul. 31, 2000

Related U.S. Application Data
(60) Provisional application No. 60/145,961, filed on Jul. 29, 1999.

(51) Int. Cl.[7] ................................................ H04N 5/335
(52) U.S. Cl. ........................ 348/308; 348/241; 348/297
(58) Field of Search ......................... 348/294, 295, 348/297, 302, 308, 362, 216.1, 217.1, 296, 241, 222.1; 250/208.1; H04N 5/335

(56) References Cited

U.S. PATENT DOCUMENTS

| | | |
|---|---|---|
| 3,911,467 A | 10/1975 | Levine et al. |
| 4,471,228 A | 9/1984 | Nishizawa et al. |
| 4,472,638 A | 9/1984 | Nishizawa et al. |
| 4,583,002 A | 4/1986 | Kondo et al. |
| 4,635,126 A | 1/1987 | Kinoshita |
| 4,758,734 A | 7/1988 | Uchida et al. |
| 4,761,689 A | 8/1988 | Takatsu et al. |
| 4,935,636 A | 6/1990 | Gural |
| 4,942,473 A | 7/1990 | Zeevi et al. |
| 4,984,002 A | 1/1991 | Kokubo |
| 5,049,752 A | 9/1991 | Kalaf et al. |
| 5,060,245 A | 10/1991 | Nelson |
| 5,227,313 A | 7/1993 | Gluck et al. |
| 5,262,871 A | 11/1993 | Wilder et al. |
| 5,264,944 A | 11/1993 | Takemura |
| 5,278,660 A | 1/1994 | Sugiki |
| 5,291,294 A | 3/1994 | Hirota |
| 5,351,309 A * | 9/1994 | Lee et al. .................... 382/199 |
| 5,354,980 A | 10/1994 | Rappoport et al. |
| 5,369,047 A | 11/1994 | Hynecek |
| 5,396,091 A | 3/1995 | Kobayashi et al. |
| 5,452,004 A | 9/1995 | Roberts |
| 5,471,515 A | 11/1995 | Fossum et al. |
| 5,481,301 A * | 1/1996 | Cazaux et al. ............... 348/218 |
| 5,485,004 A | 1/1996 | Suzuki et al. |
| 5,539,461 A | 7/1996 | Andoh et al. |
| 5,541,402 A | 7/1996 | Ackland et al. |
| 5,541,654 A | 7/1996 | Roberts |

(List continued on next page.)

FOREIGN PATENT DOCUMENTS

| | | |
|---|---|---|
| WO | WO 97/17800 | 5/1997 |

OTHER PUBLICATIONS

U.S. patent application Ser. No. 60/145,960, Stark, filed Jul. 29, 1999.

Orly Yadid–Pecht et al. "Wide Intrascene Dynamic Range CMOS APS Using Dual Sampling," *IEEE Trans. on Electron Devices*, vol. 44, No. 10, Oct. 1997, pp. 1721–1723.

(List continued on next page.)

*Primary Examiner*—Tuan Ho
(74) *Attorney, Agent, or Firm*—Eitan, Pearl, Latzer & Cohen Zedek, LLP

(57) ABSTRACT

A multi-cell cluster which includes a plurality of light-detecting unit cells and a single charge-integration and readout circuitry. Typically, each of the cells produces charge representative of the detected light. The circuit may be shared by the plurality of unit cells, and used to read-out the charge in real-time. The cluster may also Include a switch associated with each unit cell, such that each switch connects its associated unit cell to the circuit. The switch may also be controlled in a time-multiplexing manner. Each unit cell may include a photodetector, a photodiode, or a photogate. The circuit may include a shared storage device, a shared reset circuit, or a readout circuit. Typically, the shared storage device may be for accumulating the charge in the focal plane. The here-above described apparatus facilitates either static or dynamic, either local or global image resolution/sensitivity tradeoffs.

24 Claims, 8 Drawing Sheets

U.S. PATENT DOCUMENTS

| | | | |
|---|---|---|---|
| 5,546,127 | A | 8/1996 | Yamashita et al. |
| 5,563,405 | A | 10/1996 | Woolaway, II et al. |
| 5,576,762 | A | 11/1996 | Udagawa |
| 5,576,763 | A | 11/1996 | Ackland et al. |
| 5,638,120 | A | 6/1997 | Mochizuki et al. |
| 5,638,123 | A | 6/1997 | Yamaguchi |
| 5,650,352 | A | 7/1997 | Kamasz et al. |
| 5,694,495 | A | 12/1997 | Hara et al. |
| 5,721,425 | A | 2/1998 | Merrill |
| 5,739,562 | A | 4/1998 | Ackland et al. |
| 5,742,659 | A | 4/1998 | Atac et al. |
| 5,835,141 | A | 11/1998 | Ackland et al. |
| 5,841,126 | A | 11/1998 | Fossum et al. |
| 5,841,159 | A | 11/1998 | Lee et al. |
| 5,854,498 | A | 12/1998 | Merrill |
| 5,856,667 | A | 1/1999 | Spirig et al. |
| 5,877,808 | A | 3/1999 | Iizuka |
| 5,881,159 | A | 3/1999 | Aceti et al. |
| 5,896,172 | A * | 4/1999 | Korthout et al. ............ 348/248 |
| 5,949,483 | A | 9/1999 | Fossum et al. |
| 5,969,759 | A | 10/1999 | Morimoto |
| 6,078,037 | A | 6/2000 | Booth, Jr. |
| 6,091,449 | A * | 7/2000 | Matsunaga et al. ......... 348/308 |
| 6,115,065 | A * | 9/2000 | Yadid-Pecht et al. ....... 348/308 |
| 6,122,008 | A | 9/2000 | Komobuchi et al. |
| 6,141,049 | A | 10/2000 | Harada |
| 6,166,367 | A * | 12/2000 | Cho ........................... 348/308 |
| 6,252,217 | B1 | 6/2001 | Pyyhtia et al. |
| 6,300,977 | B1 | 10/2001 | Waechter et al. |

OTHER PUBLICATIONS

Orly Yadid–Pecht et al., "CMOS Active Pixel Sensor Star Tracker with Regional Electronic Shutter," *IEEE Journal of Solid State Circuits*, vol. 32, No. 2, Feb. 1997, pp. 285–288.

Orly Yadid–Pecht et al., "Wide Dynamic Range APS Star Tracker," *SPIE*, vol. 2654, 1996, pp. 82–92.

Christopher Clark et al., "Application of APS Arrays to Star and Feature Tracking Systems," *SPIE*, vol. 2810, 1996, pp. 116–120.

Orly Yadid–Pecht et al., "A Random Access Photodiode Array for Intelligent Image Capture," *IEEE Transactions on Electron Devices*, vol. 28, No. 8, Aug. 1991, pp. 1772–1780.

Sarit Chen et al., "Adaptive Sensitivity CCD Image Sensor," *SPIE*, vol. 2415, 1995, pp. 303–309.

U.S. patent application Ser. No. 09/426,452, Stark, filed Oct. 25, 1999.

U.S. patent application Ser. No. 09/516,168, Stark, filed Feb. 29, 2000.

U.S. patent application Ser. No. 09/993,886, Stark, filed Nov. 27, 2001.

U.S. patent application Ser. No. 09/993,917, Stark, filed Nov. 27, 2001.

Fossum et al., "Application of the Active Pixel Sensor Concept to Guidance and Navigation", SPIE, vol. 1949, paper 30, 1993.

Roger Paniacci et al., "Programmable multiresolution CMOS active pixel sensor", 72/SPIE, vol. 2654, 1996, pp. 72–79.

Zhimin Zhou et al., "Frame Transfer CMOS Active Pixel Sensor with Pixel Binning", IEEE Transactions on Electron Devices, vol. 44, No. 10, Oct. 1997, pp. 1764–1768.

Lisa G. McIlrath et al., "Design and Analysis of 512×768 Current–Mediated Active Pixel Array Image Sensor", IEEE Transactions on Electron Devices, vol. 44, No. 10, Oct. 1997, pp. 1706–1715.

R. Daniel McGrath et al., "Current Mediated, Current–Reset 768×512 Active Pixel Sensor Array", ISC97/Session 11/Imaging Circuits and Systems/Paper FA 11.2, p. 182–183.

Chih–Cheng Hseih et al., "A new Cryogenic CMOS Readout Structure for Infrared Focal Plane Array", IEEE Journal of Solid–State Circuits, vol. 32, No. 8, Aug. 1997, pp. 1192–1199.

Nanyoung Yoon et al., "A New Unit Cell of Current Mirroring Direct Injection Circuit for Focal Plane Arrays", SPIE, vol. 3061, pp. 93–101.

J. R. Willison, "Signal Detection and Analysis", Handbook of optics, vol. 1, Part 6, Chapter 18, McGraw Hill, 1995.

T. J. Tredwell, "Visible Array Detectors", Handbook of Optics, vol. 1, Part 6, Chapter 22, McGraw Hill, 1995.

L. J. Kozlowski and W. F. Kosonocky, "Infrared Detector Arrays", Handbook of Optics, vol. 1, Part 6, Chapter 23, McGraw Hill, 1995.

Eric R. Fossum and Bedabrata Pain, "Infrared Readout Electronics for Space Science Sensors: State of the Art and Future Directions", SPIE, vol. 2020, Infrared Technology XIX (1993), pp. 262–285.

Orly Yadid Pecht et al.: "Optimization of Noise and Responsivity in CMOS Active Pixel Sensors for Detection of Ultra Low Light Levels", SPIE vol. 3019, 0277–786X/97, pp. 125–136.

Eric R. Fossum—"Ultra Low Power Imaging Systems Using CMOS Image Sensor Technology", SPIE vol. 2267, 0–8194–1591–X/94, pp. 107–111.

Eric R. Fossum: "Active Pixel Sensors: Are CCD's Dinosaurs?", SPIE vol. 1900, 0–8194–1133–7/93, pp. 2–14.

Wolfgang Wittenstein et al: "Simulation Study on Fixed Pattern Noise and MRTD", SPIE vol. 2552, 0–8194–1911–7/95, pp. 489–501.

E. Mottin et al.: "An Improved Architecture of IRFPA Readout Circuits", SPIE vol. 3061, 0277–786X/97, pp. 117–126.

B. Pain et al.: "Low–Power, Low–Noise Analog Circuits for on Focal–Plane Signal Processing of Infrared Sensors", in Infrared Detectors and Instrumentation, Pro. SPIE, vol. 1946, pp. 365–374, 1993.

Steven Decker et al.: "A 256×256 CMOS Imaging Array with Wide Dynamic Range Pixels and a Column–Parallel Digital Output", IEEE Journal of Solid–State Circuits, vol. 33, No. 12, Dec. 1998, pp. 2081–2091.

Chih–Cheng et al.: "A new CMOS Readout Circuit Design for IRFPA with Adaptive Gain Control and Current–Mode Background Suppression", 0–7803–3073–0/96, 1996 IEEE, pp. 137–140.

Hon–Sum Wong: "Technology and Device Scaling Considerations for CMOS Imagers", IEEE Transactions on Electron Devices, vol. 43, No. 12, Dec. 1996, pp. 2131–2142.

Hon–Sum Wong et al.: "CMOS Active Pixel Image Sensors Fabricated Using a 1.8V, 0.25 $\mu$m CMOS Technology", 0–7803–3393–4, 1996 IEEE, IEDM 96–915, pp. 35.5.1–35.5.4.

G.P. Weckler, "Operation of p–n junction photodetectors in photon flux integration mode," *IEEE JSSC*, vol. SC–2, No. 3, Sep. 1967.

R. Dyck and G. Weckler, "Integrated arrays of silicon phtodetectors for image sensing," *IEEE Trans. Electron Devices*, vol ED–15, No. 4, Apr. 1968 196–201.

J.I. Nakamura et al., "CMOS active pixel image sensor with simple floating gate pixels," *IEEE Trans. Electron Devices,*. vol. 42, No. 9, Sep., 1995, pp. 1693–1694.

E-S Eid et al., "A 256×256 CMOS active pixel image sensor," *SPIE*, vol. 2415, Sep. 1995.

H. Yamashita et al., "A ⅔-in 2 million pixel STACK–CCD HDTV imager," *IEEE JSSC*, vol. 30, No. 8, Aug. 1995, pp. 881–889.

R.H. Nixon et al., "256×256 CMOS active pixel sensor camera-on-a-chip," *IEEE JSCC*, vol. 31, No. 12, Dec. 1996.

B. Dierickx et al., "Random addressable active pixel image sensors," *SPIE*, vol. 2950, Aug. 1996, pp. 2–7.

D. Scheffer et al., "Random addressable 2048×2048 active pixel image sensor," *IEEE Trans. Elec. Devices*, vol. 44, No. 10, Oct. 1997, pp. 1716–1720.

Y. Iida et al., "A ¼-inch 330k square pixel progressive scan CMOS active pixel image sensor," *IEEE JSSC*, vol. 32, No. 11, Nov. 1997, pp. 2042–2047.

T. Nomoto et al., "A 4M-pixel CMD image sensor with block and skip access capability," *IEEE Trans. Electron. Devices*, vol. 44, No. 10, Oct. 1997, 1738–1746.

S. Ohsawa et al., "Analysis of low fixed pattern noise cell structures for photconversion layer overlaid CCD or CMOS image sensors," *IEEE Trans. electron. Devices*, vol. 44, No. 10, Oct. 1997.

S. Kemeny et al., "CMOS active pixel sensor array with programmable multiresolution readout," *JPL*, California Institute of Technology, 1994.

Chamberlain S.G. and Lee J.P., "A Novel Wide Dynamic Range Silicon Photodetector and Linear Imaging Array", IEEE Transactions on Electron Device, vol. Ed. 31, No. 2, Feb. 1984, pp. 175–182.

Chen S. and Ginosar R., "Adaptive Sensitivity CCD Image Sensor", Charge–Coupled Devices and Solid State Optical Sensors V Proc. SPIE vol. 2415, pp. 303–309, 1984.

Delbruck T. and C. Mead, "Analog VLSI Phototransduction by Continuous–Time, Adaptive, Logarithmic Photoreceptor Circuits", Tech. Rep. California Institute of Technology, Pasadena California 91125, 1994. URL:http:/www.pcmp.caltech.edu/anaprose/tobi/recep/.

R. Panicacci et al., Programmable multiresolution CMOS active–pixel sensor, *SPIE*, vol. 2654, pp. 72–79.

\* cited by examiner

MULTI-PHOTODETECTOR UNIT CELL

This application claims the benefit of Provisional Application Ser. No. 60/145,961 filed Jul. 29, 1999.

FIELD OF THE INVENTION

The present invention relates to image sensor cell array architecture generally and, in particular, to a multi-photodetector unit cell and control thereof.

BACKGROUND OF THE INVENTION

Image sensors have traditionally used either photodiodes, either alone or in combination with active transistor element, or charge couple device (CCD) technology. For the last thirty years CCD has been the dominant image sensor technology.

The CCDs have many advantages, such as small pixel size, high sensitivity, and the ability to generate high-fidelity images. They also have many disadvantages, such as special manufacturing process requirements, high power dissipation, inability to integrate on the same chip additional functionality such as driving the processing, and complicated control circuitry. Furthermore, CCDs are manufactured by just a few manufacturers, and are not broadly accessible by independent design houses.

One of the emerging competing technologies, Complementary Metal Oxide Semiconductor (CMOS)-process-based active pixel sensor (APS) technology, promises low power, ability to integrate on the same chip the sensor and control circuitry, ability to form huge sensor arrays etc. One of the main goals to be accomplished in the APS design is a small pixel, comparable in size to the one accomplished with CCDs, with a high signal to noise ratio. This is difficult since the APS unit cell incorporates several active transistors. The signal-to-noise ratio requirement dictates the collection of as many photon-generated electrons as possible over the integration capacitor. This requires long integration time for weak photocurrents, and sizable capacity pixel-space-consuming capacitors.

Considerable research efforts have been directed towards reduction of the APS pixel size, and improvements in fill factor and quantum efficiency. Example of such are described in D. Scheffer et al., "Random addressable 2048× 2048 active pixel image sensor," *IEEE Trans. Elec. Dev.* Vol. 44, no. 10, October 1997, pp. 1716–1720, and in Y. Iida et al., "A ¼-inch 330k square pixel progressive scan CMOS active pixel image sensor," *IEEE JSSC*, Vol. 32, no. 11, November 1997, pp. 2042–2047.

The following is a partial listing of non-standard and standard technology alternatives used to achieve the above mentioned improvements.

Non-standard Technologies

Because standard technology fails to support special new applications, ample of research effort has been put in to the development of non-standard technology.

Amorphous silicon photoconductor, photodiode, or phototransistor: This endeavor produces a reduced unit cell size and improved fill factor through photodetector vertical integration on top of the active readout circuit. The quantum efficiency is close to 100%, and the dark current is lower in comparison to the dark current accomplished with the single-crystal material. However, due to material charge trapping and structure irregularities, the amorphous silicon based photodetectors suffer from high fixed pattern noise (FPN). Backside-illuminated photodetectors: In this technology, whether CCDs or APS-based, the sampling and readout is located on the front side, and the photodetector occupies the backside of the image sensor. The image sensor is illuminated from its backside. Therefore, the fill factor, and quantum efficiency of nearly 100%, can be accomplished.

However, in order to produce the backside-illuminated photodetector, a process known as wafer thinning is required, which is a complex, expensive process. Therefore, backside-illuminated image sensors are employed for very specialized scientific and aerospace cost-insensitive applications. Furthermore, wafer thinning results in substantial crystalline irregularities nearby the wafer's surface and in a substantial excess noise due to surface recombination. Charge modulation devices (CMD): The CMD is distinguished by its simple structure. Due to its simple structure (a single transistor) very small pixels are achievable. This facilitates the implementation of huge-format arrays. However, the CMD image sensors are less sensitive to shorter wavelengths of light and require a specialized fabrication process.

Standard CMOS Processes

A lot of effort goes into research directed at the implementation of high-performance image sensors using a standard CMOS process for fabrication. This direction is of primary importance, since it promises low fabrication costs for on-chip cameras with readily available technology. Constructing high-quality APS image sensors takes the following directions:

Passive photodiode-detector image sensors: These image sensors use photodiodes as the sensing elements. Passive photodiode-based pixel elements were investigated in the 1960s. These pixels are very simple; they incorporate a single diode and a single transistor. The passive pixel design allows the highest fill factor for a given pixel size, or the smallest pixel size for a given fill factor.

However, this approach is limited by the relatively high readout noise. Also, the passive unit cell directly drives a full column-capacitance in the image sensor array. Since this capacitance Is directly proportional to the number of column pixels, this limits the readout speed and results in significant readout noise. Therefore, the passive pixel approach is not well suited to the design of large-format image sensors.

Active-pixel photodiode-based image sensors: Photodiode-based APS image sensors feature a high quantum efficiency for the red, the green and even for the blue-wavelength photons. The name "active pixel sensor" originates from its having at least one active transistor incorporated in every unit cell. The transistor performs an amplification or buffering function.

There are many types of active circuits. The simple ones incorporate up to three transistors in the unit cell. The APS photodetectors are limited in their fill factor per fixed unit cell size, or are limited in the minimum cell size per fixed fill factor. It is a major objective to reduce the overall unit cell complexity, to accomplish high-resolution, a high fill factor and a high quantum efficiency.

Interestingly enough, small pixels result in a reduced readout noise and speed improvement, due to a reduced column capacitance. Although designs with a minimal number of transistors and very small pixels have been reported (5.6×5.6 $\mu$m), these designs also feature a very small fill factor (15.8%).

Active-pixel photogate-type image sensors: The basic concept behind this circuit is to combine the sensing and charge storage functions. The front-side light-illuminated transistor collects charge proportional to light-intensity below the gate. At the readout time, the charge collected and stored below the photogate is transferred to the floating diffusion node The floating diffusion is tied to the source follower circuit input. The source follower buffers the floating diffusion from the high capacitance array column.

Overall, the photogate pixel design incorporates five transistors including the photogate sensing/charge-storage device. The low readout noise and lack of image lag demonstrated by the photogate structure have stirred a lot of interest and have resulted in significant research effort directed at. the improvement of the photogate-based design. Relatively small pixels have been developed (10×10 $\mu$m using the 0.5 $\mu$m CMOS process technology). However, this approach demonstrates however low quantum efficiency for the blue light wavelength photons, which are absorbed by the polysilicon-plated photogate.

In order to overcome this problem, some engineering compromises are made and APS-based sensors that combine the photogate and the photodiode design have been invented. This design uses photogate sites to collect the red and the green wavelength photons and photodiode sites to collect the blue wavelength photons.

Multi-Resolution

The ability to modify the image sensor's resolution is defined as multi-resolution. The application of multi-resolution has been justified by the ability to trade high resolution for the increase of the video frame rate and the image processing. Far more important, the multi-resolution approach makes it possible to trade the resolution for signal-to-noise ratio. This is especially crucial in low light conditions, when the electrical signal proportional to the light intensity may be quite weak This results in a noisy, low-quality image. Sometimes it is preferable to get a lower resolution but less-noisy image.

One of the methods used, as described by S. Kemeny et al: "CMOS Active Pixel Sensor Array with Programmable Multiresolution Readout", JPL, California Institute of Technology, Pasadena Calif. 91109 USA, 1994, and by R. Paniacci et al: "Programmable multiresolution CMOS active-pixel sensor", SPIE Vol. 2654, trades resolution for speed. The method is based upon pixel signal block averaging. The described method is complicated, and does not yield a better signal-to-noise ratio The second method, as described by Zhimin Zhou et al: "Frame-Transfer CMOS Active Pixel Sensor with Pixel Binning", IEEE Trans. Elec. Dev., Vol. 44, No. 16, October 1997, pp. 1764–1768, enables the summation of the accumulated charge in several pixels. The accumulated charge summation is performed first by sampling the charge accumulated during charge integration into a memory cell, and second, by summing up the transferred charge on vertical and horizontal charge integration amplifiers (CIAs).

Since, the charge summation is linear, while the noise sums up as a square root of the noise energies, the pixel charge summation yields an improvement in the signal-to-noise ratio.

SUMMARY

It is an objective of the present invention to provide a CMOS image sensor architecture that produces a substantially optimal combination of sensitivity and signal-to-noise ratio, along with relatively high fill factor. There is therefore provided, in accordance with an embodiment of the present invention, a multi-cell cluster that may include a plurality of light-etecting unit cells and a circuit. Typically, each of the cells produces charge representative of the detected light. The circuit may be shared by the plurality of unit cells, and used to read-out the charge in real-time. The cluster may also include a switch associated with each unit cell, such that each switch connects its associated unit cell to the circuit. The switch may also be controlled in a time-multiplexing manner. Each unit cell may include either a photodetector, a photodiode, or a photogate. The circuit may include a shared storage device, a shared reset circuit, or a readout circuit. Typically, the shared storage device may be for accumulating the charge in the focal plane.

There is further provided, in accordance with an embodiment of the present invention, a sensing array including a multiplicity of clusters, sampling lines and sensing lines. The clusters may include a plurality of unit cells and a circuit. The unit cells may detect light, and produce charge representative of that light. The circuit may be shared by the unit cells and may control the operation of the unit cells. The circuit may also accumulate the charge. Each sampling line may be connected to a row of clusters for sampling the accumulated charge in the row. Each sensing line may be connected to a column of clusters for sensing the sampled charge present in the columns. The sampling and the sensing lines may also carry programming signals for controlling the plurality of unit cells.

There is also provided, in accordance with an embodiment of the present invention, a method for operating an image sensor. The method includes the steps of integrating charge from one or more unit cells of a cluster and, during the step of integrating, summing charge from at least one of the unit cells in the focal plane. The method may also include reading out the summed charge. One or more of the unit cells may be preprogrammed unit cells, and the step of reading out may include reading out the summed charge in real time.

The step of integrating may include the step of integrating in a time-multiplexing manner, or may include the step of integrating charge from each unit cell separately. Alternatively, the step of integrating may include the step of simultaneously integrating charge from two or more of the unit cells, or may include the step of simultaneously integrating charge from all of the unit cells in the cluster. The method may include the step of combining the readout into a single image.

The method may further include the step of dynamically controlling selection of the number of unit cells for the step of charge integrating, and this step of dynamically controlling may include the step of selecting the number of unit cells depending on the light conditions. All of the steps may be performed in real-time.

Also included in the method may be the step of improving the signal-to-noise ratio of the image sensor by increasing the number of cells in the step of charge integrating. This is done in order to linearly increase the amount of summed charge while the noise increases moderately as a square root function. The method may further include a step of improving the resolution of the image sensor by reading-out each cell separately, in a time-multiplexing manner.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention discloses a multi-resolution sensor, which utilizes time multiplexing to vary charge summation of a cluster of unit cells. The clusters are supported by shared simple circuitry, which implements the charge collection and time multiplexing, thus eliminating the need for complicated charge summation circuitry The novel multi-resolution sensor enables implementation of smaller pixel size and improved pixel fill factor. Furthermore, the present method enables selection of a per-scene-illumination optimal compromise between the image sensor's resolution on the one hand and signal-to-noise and sensitivity on the other.

Structure of Sensor 10

Figure 1:
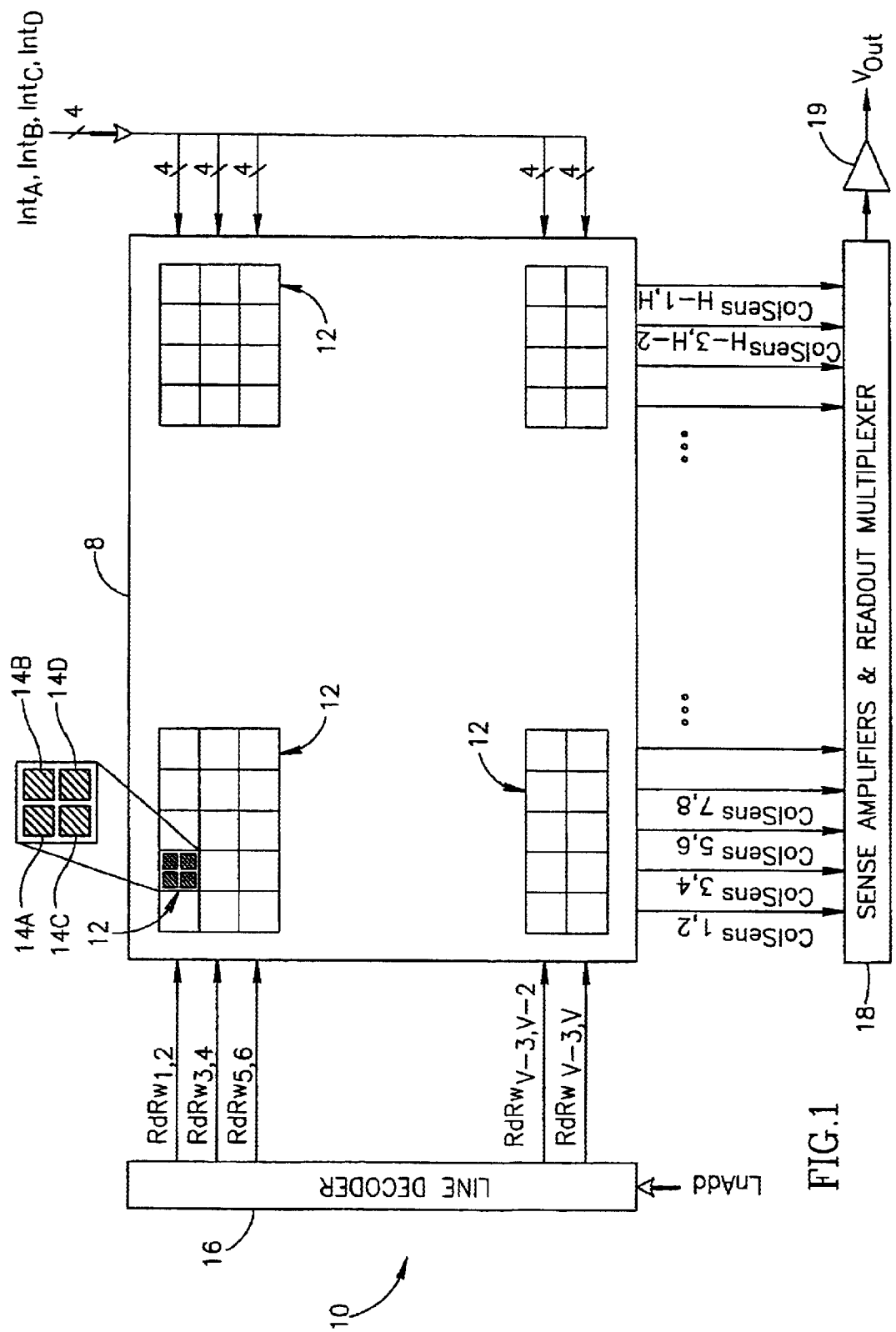
FIG. 1 illustrates an active pixel sensor (APS) image sensor architecture implemented on a monolithic piece of a semiconductor material, constructed and operative in accordance with a preferred embodiment of the present invention.

Reference is now made to FIG. 1, an illustration of an active pixel sensor (APS) 10 comprising an array 8, a line decoder 16, and a sense amplifiers/readout multiplexer 18. Array 8 comprises a multitude of multi-photodetector clusters 12. Each cluster 12 comprises n unit cells 14.

Array 8 further comprises a multitude of column-sense lines, designated ColSense 1 to H, and a multitude of read-row lines, designated RdRw 1 to V. Each line carries associated signals, i.e. the read-row lines RdRw carry read-row signals RdRw. Charge integration, or exposure, of unit cells 14 is controlled by an associated integration signal Int carried by an integration line, designated Int. The clusters 12 are arranged in array 8 in H-columns by V-rows.

In the embodiment illustrated, the read-row line RdRw is shared between the unit cells 14 in adjacent rows, such as in rows i, and i+1, and is therefore double-indexed. Similarly, the column-sense line $ColSense_{j,j+1}$ is shared between photodetector cells connected to columns j and j+1, and is also double-indexed. This pairing of elements provides additional space saving benefits.

Structure of the Clusters 12

Figure 2:
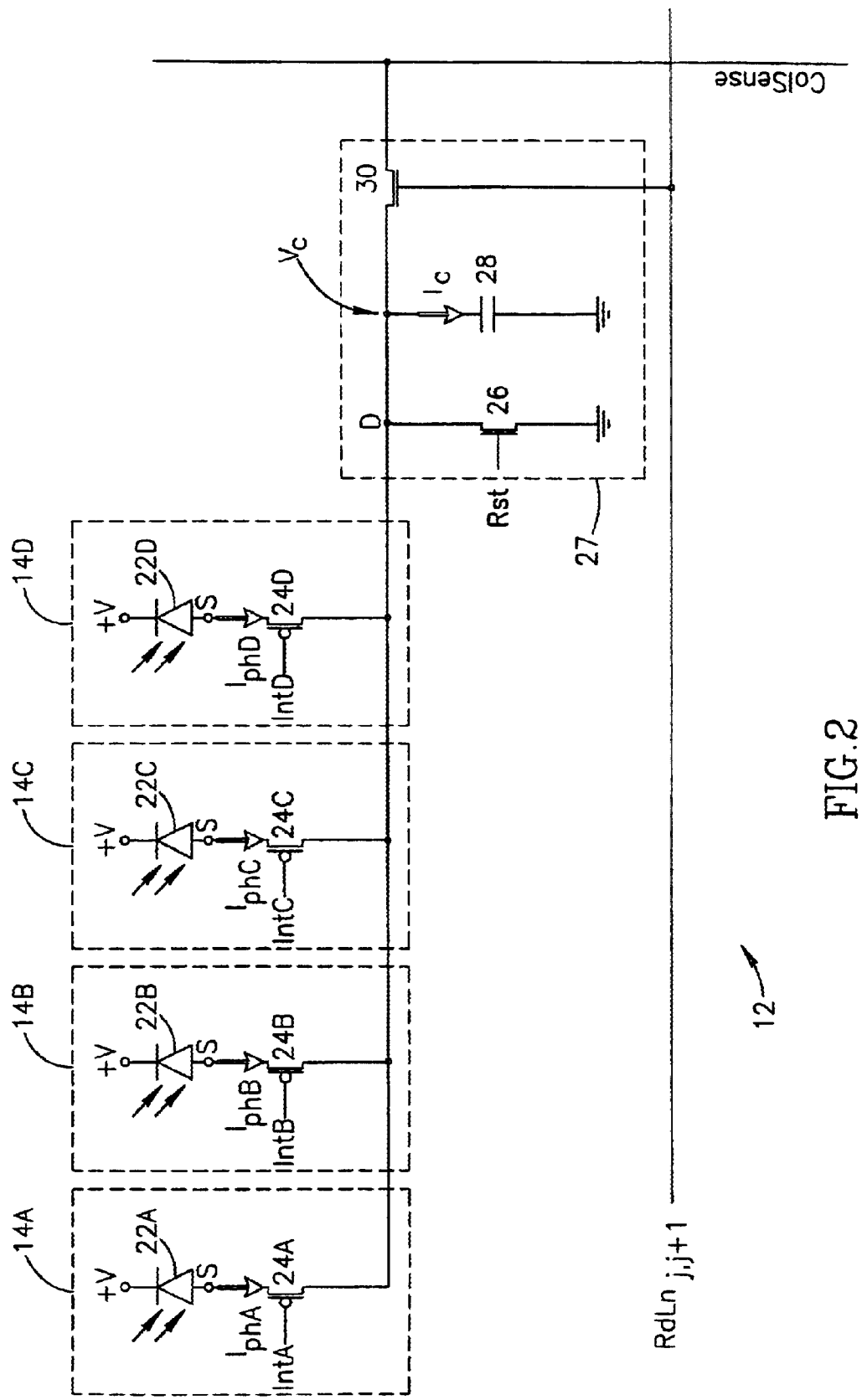
FIG. 2 is a schematic illustration of a four-photodetector unit cell based upon a direct injection (DI) circuit and is used with the architecture of FIG. 1.

Reference is made to FIG. 2, a schematic diagram of one possible embodiment for cluster 12 and useful in understanding the present invention. Each unit cell 14 comprises an associated photodetector 22 and an associated transistor 24. Typically the operations of cluster 12 are based on direct injection circuitry.

In the exemplary description herein, clusters 12 comprise four unit cells 14, generally designated 14A to 14D. However, it is noted that clusters 12 could comprise alternative pluralities of unit cells 14, such as 8 or 16 pixels, and still comply with the principles of the present invention. For purposes of clarity herein, unit cells 14A to 14D and their associated elements are designated A–D, accordingly.

Via the present novel architecture, the integration charge as accumulated by the group of unit cells 14 is summed up either individually or in any combination, thus offering the ability to select an optimal balance between resolution and signal-to-noise ratio/sensitivity. Operation of cluster 12 is described hereinbelow.

Within cluster 12, all of the four unit cells 14 are clustered to share a single reset/readout circuit 27. Circuit 27 comprises a reset transistor 26, an integration capacitor 28, and a readout transistor 30. This reduces on average by a factor of four the number of readout transistors per single transistor 24, and contributes to a smaller pixel pitch, and/or a greater fill factor per unit cell 14, and/or a larger integration capacitor.

It is thus noted that clusters 12 provide the advantage of being relatively simple with space savings resulting from two measures: shared charge-integration/readout circuitry and shared readout/sense lines.

The present novel architecture can be used in conjunction with other nonstandard and standard technologies and circuit design techniques. Furthermore, photodetector clustering can be applied to any type of APS type image sensor any type of an active circuit, which results in a pixel pitch reduction and fill factor improvement. Similarly, the present invention can be used with any semiconductor manufacturing process. For the particular embodiment depicted in FIG. 2, transistors 24, are of P-channel type due to the selected signal polarity and the process. However, occasionally due to other considerations, N-channel transistors are selected to perform the common gate amplifier function.

Figure 3:
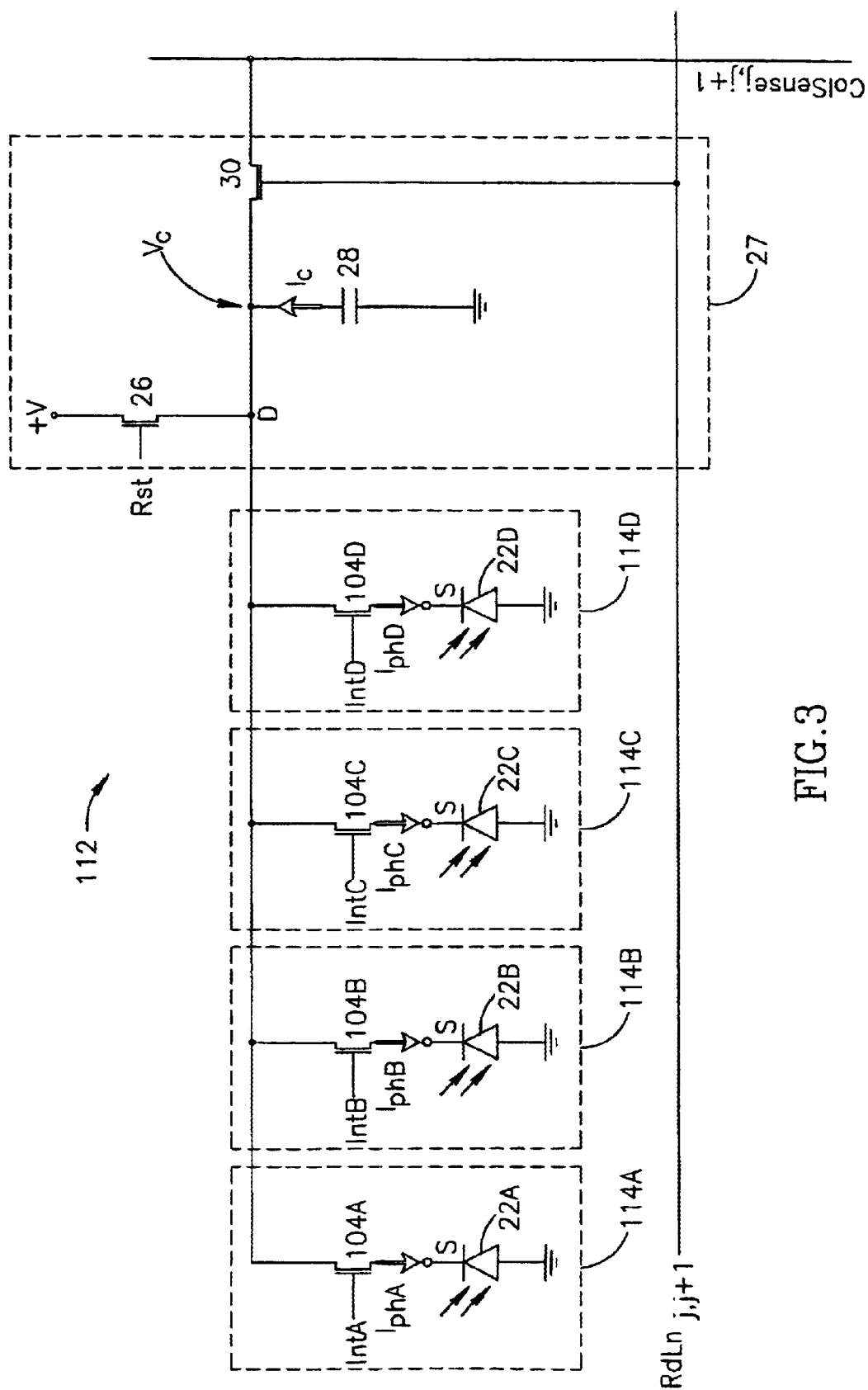
FIG. 3 is a schematic illustration of a four-photodetector unit cell similar to that of FIG. 2 and, operational with opposite polarity signals.

An example of such is depicted in FIG. 3, to which reference is now made. FIG. 3 illustrates an alternative cluster 112 comprising unit cells 114. In contrast to FIG. 2, the unit cells 114 of FIG. 3 comprise N-channel transistors 104 which perform the same associated function as that performed by transistors 24 of FIG. 2. Elements similar to those in FIG. 2 are similarly referenced and will not be explained further. Reference is now made an alternative embodiment of clustered unit cells, FIG. 4, which illustrates a four-photogate cluster 212. Elements similar to those described above are similarly numbered and will not be described further.

Cluster 212 comprises four unit cells 214, reset transistor 26, buffer 108 and readout transistor 30. Each such unit cell 214 comprises an associated photogate sensors 102 and N-channel type transistors 104, Similar to the principle described hereinabove in connection with FIGS. 2 and 3, the four photogates 102, share the single, reset, source follower buffer 108, and the readout transistor 30, which reduces the average number of transistors per photogate sensor 102.

It is noted that although only 3 embodiments of the present invention are presented herein, other combinations of unit cells and shared circuitry, such as, for example, photogates and P-channel transistors, fall within the principles of the present invention.

Operation of Sensor 10

Referring again to FIG. 1, sensing of an image on the level of sensor 10 is as follows: A series of associated integration signals Int are applied to clusters 12, driving charge integration therein. Charge is accumulated in an integration capacitor (not shown in FIG. 1), typically proportional to the charge-integration time and to the local light intensity.

Operation of Clusters 12

Referring again to FIG. 2, the operations of cluster 12 are as described below. It is noted that the operations for clusters 112 and 212 (FIGS. 3 and 4, respectively) are similar and are included within the principles described below. Except where different, operations of clusters 112 and 212 will not be described further.

Operaton Cycle

The sequence of the FIG. 2 image sensing and readout cycle on the level of cluster 12 is as follows: The cycle starts by driving the reset signal Rst, thus causing the reset transistor 26 to conduct and capacitor 28 to flush any residue charge originating in the previous cycle.

Photodetectors 22, being exposed to light, transmit associated photocurrents $I_{ph}$, generally designated $I_{ph-A}$ to $I_{ph-D}$. The associated integration signals Int-A to Int-D, respectively, are applied to their associated transistors 24, opening the associated transistors 24, thus allowing flow of photocurrent $I_{ph}$ from the associated photodetectors 22.

Transistor 24, acting as a common gate amplifier, isolates the associated photodetector 22 from capacitor 28, and provides photocurrent $I_{ph}$ unaffected by the voltage changes in the capacitor 28. Transistors 24 additionally transduce the photocurrent $I_{ph}$ from the photodetector 22 into the capacitor 28.

The charge integration cycle is terminated when the integration signal Int signal goes high, cutting off the associated transistors 24 and restricting flow of photocurrent $I_{PH}$. Read-row signal RdRw goes high, causing readout transistor 30 to conduct and read out the accumulated charge on integration capacitor 28. Conduction of readout transistor 30 enables the capacitor 28 to transfer the accumulated charge over the column sense line ColSense to a sense amplifier (not shown). The cycle is then repeated, starting with flushing of the capacitor 28.

It is noted that transistor 26 is optional, since the reset function can be alternatively performed through the readout transistor 30. It is further noted that for some readout circuits, the residue charge left on capacitor 28 may be negligible; however, preferably the residue charge is flushed prior to the next integration sub-cycle.

Sub-cycles

The image sensing cycle comprises equal length sub-cycles. Each sub-cycle comprises reset, charge integration and readout for the associated unit cell 14. Therefore, there is one sub-cycle for unit cell 14A, one sub-cycle for unit cell 14B, and so on, for a total of 4 sub-cycles.

It is noted that depending on the setting of cluster 12, it is possible to program the duration and the number of the sub-cycles, This programming capability allows varying the duration and content of the sub-cycles by varying the charge integration sampling of the unit cells 14. It is thus also possible to vary the number of sub-cycles per cycle.

As an example, each of the four unit cells 14 can be individually sampled (individual sub-cycle) for a total of 4 sub-cycles per cycle. Alternatively, the four unit cells 14 can be sampled in pairs (dual sub-cycle) for a total of 2 sub-cycles per cycle, Furthermore, all four unit cells 14 can sampled simultaneously (simultaneous sub-cycle) for a total of 1 sub-cycle per cycle.

Each sampling rate provides different levels of resolution and sensitivity. The highest resolution but lowest sensitivity is achieved with individual sub-cycles, and the lowest resolution and highest sensitivity is achieved with simultaneous sub-cycles.

It is noted that if cluster 12 were to comprise more unit cells 14, such as 6 or 8 or 16, the number of sub-cycles and resultant imaging performances would vary accordingly.

Still referring to FIG. 2, the following is a model of exemplary operation of individual sub-cycles (separate sampling of each unit cell 14). The integration signals Int-B, Int-C, and Int-D signals are driven high, cutting off photocurrent flow from transistors 24B to 24D. Meanwhile, integration signal Int-A is pulled to the $V_{bias}$ voltage or low level, allowing transistor 24A to conduct. Photocurrent $I_{ph-A}$ flows from photodetector 22A through the associated transistor 24A, and is accumulated in capacitor 28. Integration signal Int-A signal then goes high, cutting off the transistor 24A. The accumulated charge on capacitor 28 is then read-out.

The next sub-cycle is then executed, this time with integration signals Int-A, Int-C, and Int-D being driven high, and integration signal Int-B pulled to low, and so on for unit cells 14C and 14D, until all four unit cells 14 have completed their respective sub-cycle and the sampling and readout of the entire image sensor 10 is complete.

It will be apparent to those skilled in the art that by controlling the timing of the integration signals Int-A to Int-D it is possible to allow one or more transistors 24 to conduct simultaneously, and thus one or more associated unit cells 14 can be read out simultaneously. As an example, for dual-sub-cycles the associated integration signals Int-A and int-B are simultaneously activated, and therefore the photocurrents from unit cells 14A and 14B are simultaneously summed up. This reduces the spatial resolution by a factor of two in one direction and improves the signal-to-noise ratio by $\sqrt{2}$ and sensitivity by a factor of 2.

As another example, for simultaneous sub-cycles the associated integration signals Int-A to Int-D are simultaneously activated, and the photocurrents from all four-unit cells 14 are simultaneously summed up . This reduces the spatial resolution by a factor of two in each direction but significantly improves the signal-to-noise ratio and sensitivity.

Thus, the application of the present photodetector clustering invention provides efficient multiresolution function along with the ability to tradeoff resolution versus sensitivity, and vice versa.

Figure 4:
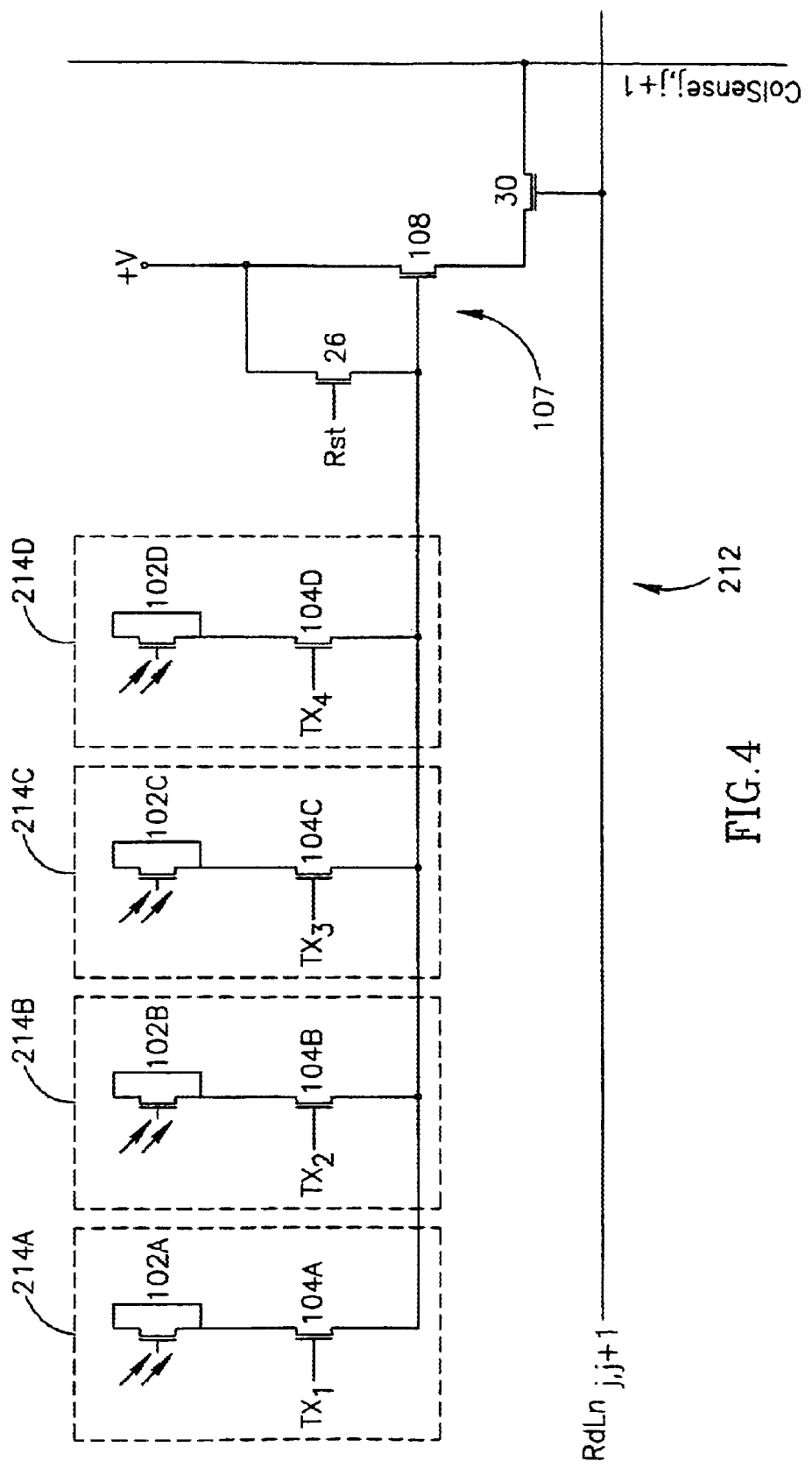
FIG. 4 is a schematic illustration of an aternative four-photodetector unit cell based upon N-channel type photogate transistors.

Reference is now made to FIG. 4 and the operations of cluster 212. In contrast to the above example, each photogate 102 accumulates its charge on its own associated capacitor (not shown). Therefore, since all the photogates 102 may collect charge, the charge-integration time is not compromised as the result of time-multiplexed sampling/readout. Cluster 212 is also capable of multiresolution, as described hereinbelow with reference to FIGS. 5–8; however, for cluster 212 the integration time is fixed. The improvement in the signal-to-noise ratio is proportional to the number of simultaneously sampled photogates. The resolution is reduced by the same factor.

Timing Diagrams

Figure 5:
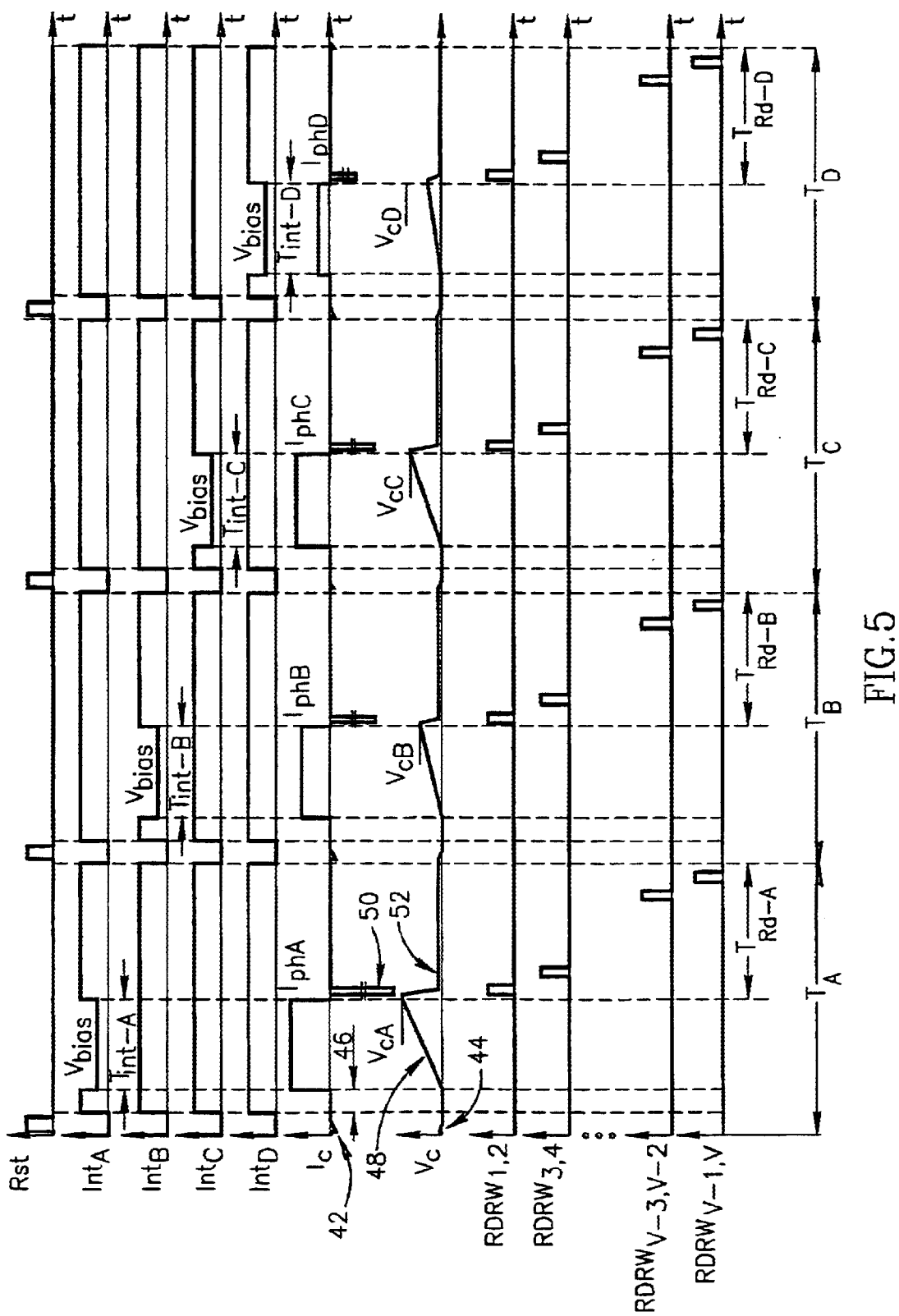
FIG. 5 is a timing diagram of individual control signal timing sequences when implemented with the architecture illustrated in FIG. 1.

Reference is now made to FIG. 5, a timing diagram depicting individual sub-cycles for each of the four-unit cells 14, and useful in understanding the operation of the embodiment depicted in FIG. 2.

It is noted that the depicted signal polarities are exemplary and, if reversed, would be applicable to the embodiment depicted in FIG. 3 Additionally noted in reference to FIG. 5, elements similar to those previously described are similarly designated and will not be discussed in further detail.

For purposes of clarity in the explanation of the following figures, reference to an activity performed by a specific element is denoted with a subscript letter, while explanations of general activities are sans subscript. As an example, photocurrent $I_{ph}$ from transistor 22A is denoted as photocurrent $I_{ph-A}$, while photocurrent for general explanation purposes is denoted as photocurrent $I_{ph}$.

FIG. 5 depicts four sub-cycles, labeled $T_A$, $T_B$, $T_C$ and $T_D$, respectively. During each sub-cycle T, the associated unit-cell 14 runs through an entire cycle of reset, sampled and read out. For example, during sub-cycle $T_A$, photodetector 22A is reset, sampled and read out, and so on.

FIG. 5 additionally depicts the timing of the reset signal Rst, the four integration signals Int-A to Int-D, a capacitor photocurrent $I_C$, a capacitor voltage $V_C$, and the four read-row signals RdRW$_{A-D}$ respectively.

The cycle depicted in FIG. 5 starts at point 42 with sub-cycle $T_A$. At point 42 reset signal Rst is pulled to high, causing discharge of integration capacitor 28. It is noted that when reset signal Rst is high, all the other signals (Integration and ReadRow) are low.

As depicted by point 44, the reset signal Rst also drives capacitor 28 into a deep depletion state, as noted by drop of capacitor voltage $V_C$. The Reset signal Rst then goes low, switching off transistor 26. Shortly after, all the integration signals Int-A to Int-D are pulled high, disconnecting photodetectors 22 from capacitor 28 for a brief period, as designated by period 46.

Charge integration sub-period $T_{int-A}$ starts when the integration signal Int-A levels to voltage $V_{bias}$, causing transistor 24A to operate as a common gate preamplifier, allowing photocurrent $I_{ph-A}$ from photodetector 22A to flow into the capacitor 28 for a charge integration sub-period $T_{int-A}$. It is noted that concurrently, integration signals Int-B to Int-D remain high, restricting flow from photodetector 22B to 22D.

Thus, since photocurrent $I_{ph}$ flows only from transistor 22A, during charge integration sub-period $T_{int-A}$, the capacitor photocurrent $I_C$ is equal to photocurrent $I_{ph-A}$. Additionally, assuming that the integration capacitor 28 is linear and does not vary with voltage, the capacitors voltage $V_C$ rises linearly in time, as noted by slope 48.

Thus, $I_C=I_{ph-A}$ and $V_C=V_{C-A}$

The end of integration sub-period $T_{int-A}$ is designated by peak voltage $V_{C-A}$. Completion of the integration sub-period $T_{int-A}$ is followed by a readout period $T_{Rd-A}$. Readout is performed sequentially, line after line in the array and is controlled by the readout signals RdRw$_{1,2}$, RdRw$_{3,4}$, . . . , RdRw$_{V-3,V-2}$, RdRw$_{V-1,V}$, which activate sampling of the accumulated charge in the capacitor 28.

Sampling of the integration capacitor 28 flushes the capacitor, as depicted as drop 50, although some small residue charge may still be left on the capacitor 28, as depicted by level 52.

Sub-cycle $T_B$ then starts, commencing again with the reset signal Rst being pulled to high, causing discharge of capacitor photocurrent $I_C$ from integration capacitor 28. Steps as performed for sub-cycle $T_A$ are repeated for sub-cycle $T_B$ through $T_D$, with the appropriate signals for the associated unit cells 14.

Typically, the integration period $T_{int}$ and readout period $T_{rd}$ for all the photodetectors 22 in cluster 12 is identical, unless the image sensor enables individual tuning of the charge integration time for each unit cell 14. Thus sub-cycle $T_A=T_B=T_C=T_D$ and the entire image sensor sampling/readout cycle T is ($4 \times T_A$).

Figure 6:
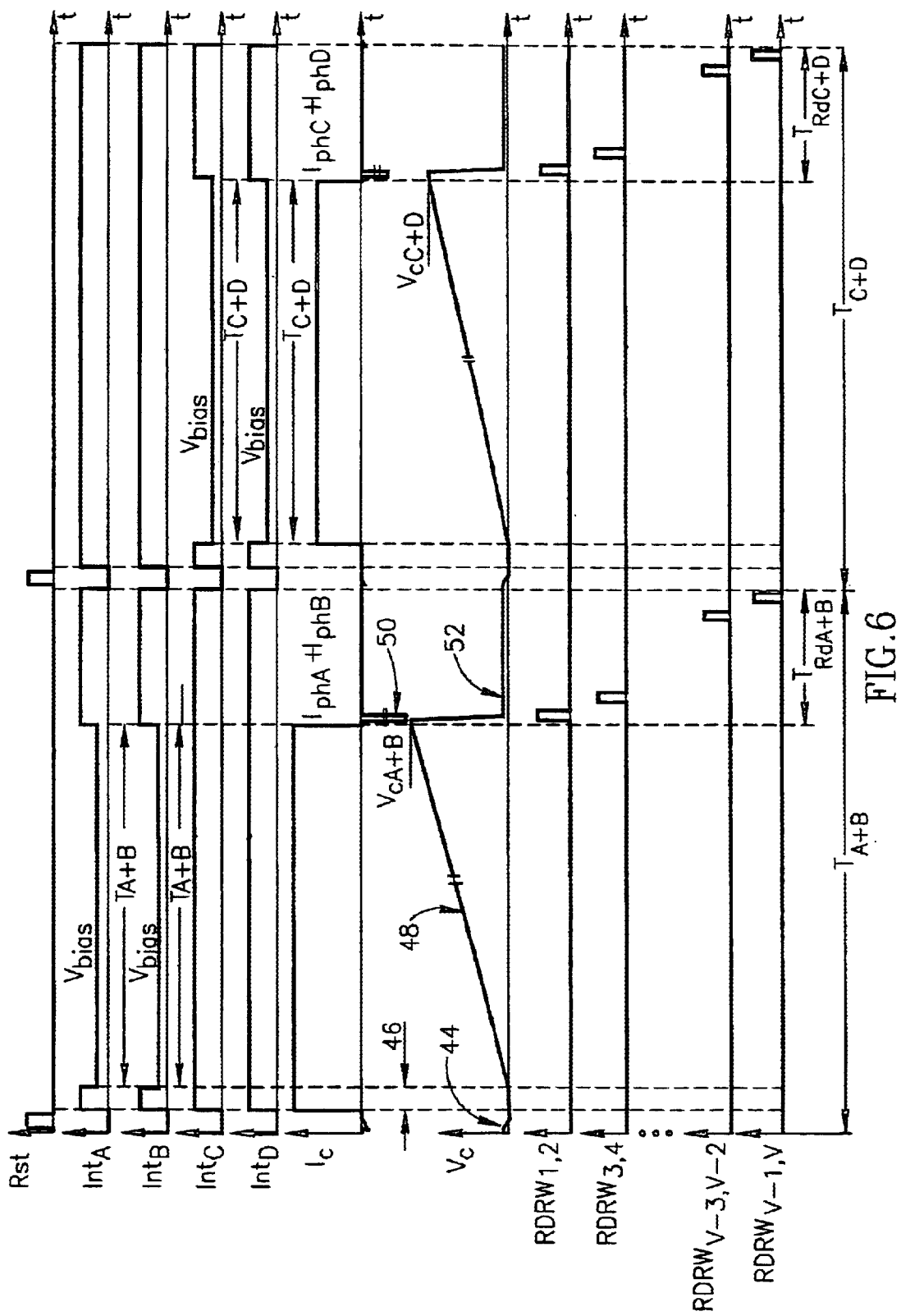
FIG. 6 is a timing diagram of control signal timing sequence for simultaneously sampled horizontal photodetector pairs.

Alternative timing for charge-integration samplings is possible. Reference is now made to FIG. 6, which depicts dual sub-cycles of simultaneous sampling of photodetectors 22A and 22B, followed by simultaneous sampling of photodetectors 22C and 22D. Elements similar to those described above are similarly numbered and will not be described further.

For the instance illustrated in FIG. 6, the capacitor photocurrent $I_C=I_{ph-A,+Iph-B}$, and if the photocurrents $I_{phA}$ to $I_{phD}$ are identical, then $I_C=2I_{ph-A}=2I_{ph-D}$. Additionally, dual sub-cycle periods $T_{A+B}+T_{C+D}=T_A+T_B+T_C+T_D$.

As depicted in FIG. 6, the length of dual-readout sub-periods $T_{Rd-A+B}$ is roughly equivalent to individual readout period $T_{Rd-A}$. Thus the result net time left for the dual-integration sub-period $T_{int-A+}B$ is longer, resulting in a much larger capacitance voltage $V_C$, where $V_C=V_{C-A+B}$.

Figure 7:
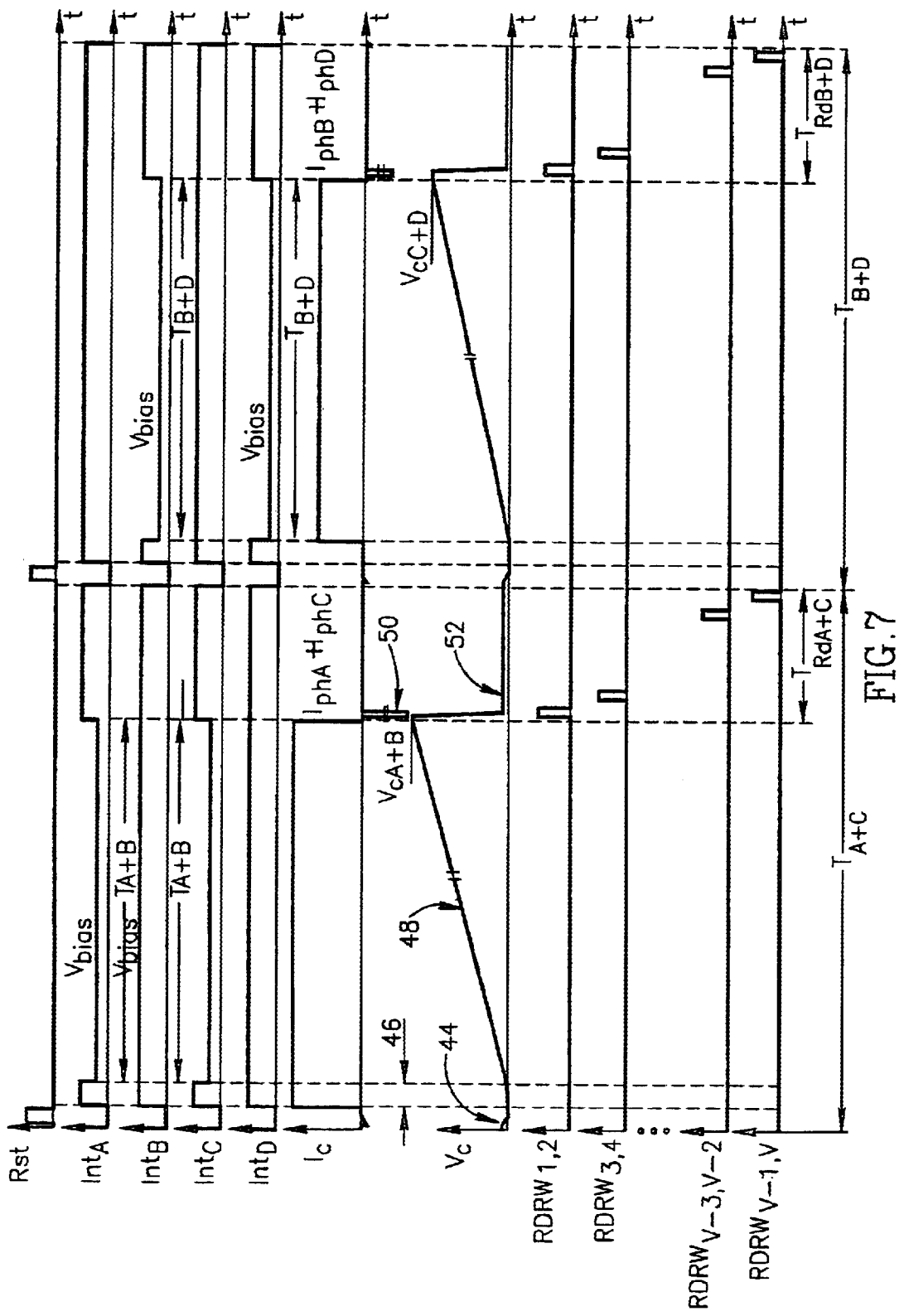
FIG. 7 is a timing diagram of control signal timing sequence for simultaneously sampled vertical photodetector pairs.

Reference is now made to FIG. 7, an illustration of simultaneously sampling of photodetectors 22A and 22C, followed by photodetectors 22B and 22D. The results of the sampling for FIG. 7 are similar to those achieved from the sampling illustrated in FIG. 6.

Figure 8:
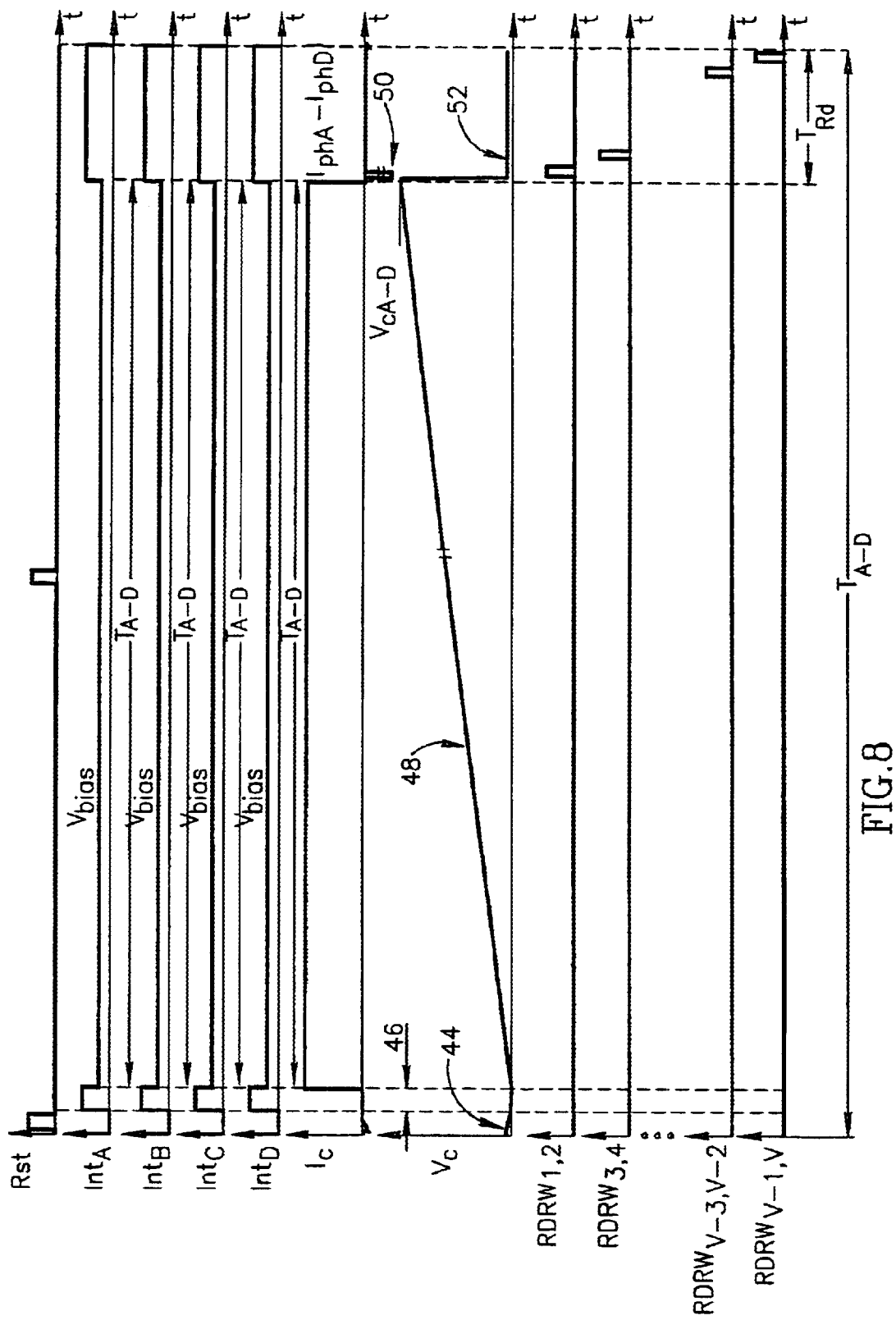
FIG. 8 is a timing diagram of control signal timing sequence for simultaneously sampled photodetector quadrants.

Reference is now made to FIG. 8, an illustration of sampling of all four photodetectors 22 simultaneously. This sampling method results in the highest sensitivity but the lowest resolution. Calculations of signal-to-noise ratios and integration time are located in the Appendix.

Sensor Applications

As is apparent to one skilled in the art, the resolution and signal-to-noise ratio as produced by the embodiment illustrated in FIG. 5 is not equivalent to that depicted in FIG. 6. Since the signal-to-noise ratio improves as a square root of the integration time while the integration time more than doubles (due to halved readout time for the same frame rate), and the photocurrent signal more than doubles in FIG. 6 as compared to FIG. 5, the dual signal-to-noise ratio improves by more than $\sqrt{2}$ times for the dual integration than for the individual signal-to-noise ratio.

In contrast, since photodetectors 22A and 22B are in the same row while photodetectors 22C and 22D are in the next row below, the sampling sequence illustrated in FIG. 6 results in a reduced horizontal resolution. Thus for dual sub-cycles, while the signal-to-noise ratio improves, it is at the cost of reduced resolution.

In the time diagram of FIG. 7, photodetectors 22A and 22C are in the same column, while photodetectors 22B and 22D are in the next column to the right, resulting in reduced vertical resolution and improved signal-to-noise ratio.

Finally, in FIG. 8, simultaneous sub-cycles result in half the resolution in the horizontal direction as well as in the vertical direction. However, the signal-to-noise ratio is greatly improved.

Thus, by analyzing the operations of FIGS. 5–8, it is possible to appreciate that the present invention provides the ability to select the appropriate resolution and signal-to-noise ratio for the relevant application.

It will be appreciated by those skilled in the art that many of the prior art technologies can be used in conjunction with the present invention. As an example, backside-illuminated image sensors, when combined with a multi-photodetector unit cell, enables implementation of smaller pixels.

It will be appreciated by persons skilled in the art that the present invention is not limited to what has been particularly shown and described hereinabove. Rather the scope of the present invention is defined only by the claims that follow:

APPENDIX

Equations

The tradeoff between resolution and signal-to-noise ratio is explained in the following series of equations. The photocurrents $I_{ph}$ as summed-up in capacitor is:

$$I_c = \sum_{j=0}^{K-1} I_{ph-j} \tag{1}$$

and current noise $I_n$ sums up as:

$$i_n = \left(\sum_{j=0}^{K-1} i_{n-j}^2\right)^{1/2} \tag{2}$$

where, $I_C$ is the total current charging the capacitor at once, $I_{ph-j}$ is the individual current flowing from the j-th photodetector into capacitor, $i_n$ is the total, current noise originating from photodetector, $i_{n-j}$ is the j-th photodetector current noise, and K is the number of the simultaneously conducting photodetectors.

It is noted that the above formula assumes that the photodetector originated noise is dominant, while other types of noise sources, such as the reset noise and 1/f noise originating from the switching transistor, are negligible.

If the signal-to-noise ratio is defined as:

$$\frac{S}{N} = \frac{I_c}{i_n} \tag{3}$$

and provided that all the photodetectors sink the same photocurrent $I_{ph}$, and generate the same noise during the charge Integration period, and assuming that other noise sources are negligible, then $$\left(\frac{S}{N}\right)_K = \frac{S}{N} \times \frac{1}{\sqrt{K}} \tag{4}$$

for thermal noise, where SIN is the signal-to-noise ratio for a single photodetector charging the integration capacitor, and (S/N)K is the signal-to-noise ratio, when K photodetectors are simultaneously charging the integration capacitor.

Thus, as an example, if K=4 and the charge integration time is kept constant, the signal-to-noise ratio improves by a factor of 2.

Typically, under normal conditions, photocurrent $I_{ph}$ is very small and the transistor operates in the weak inversion region, Provided that the integration capacitor is linear and does not vary with voltage, then:

$$I_c = I_{ph} \tag{5}$$

$$V_c = \frac{I_C}{C_I} \times t \tag{6}$$

where $I_C$ is the current from the capacitor and t is the integration sub-period. For instances where t equals integration sub-period $T_{int}$, the capacitor voltage $V_C$, level is, $$V_c = \frac{I_C}{C_I} \times T_{int} \tag{7}$$

Furthermore, if $T_A$ is the sub-cycle of photodetector A, $T_{int-A}$ is the integration period for photodetector A, $T_{rd-A}$ is the readout time for photodetector A.

Then, $$T_A = T_{int-A} + T_{rd-A} \tag{8}$$

Since typically the integration period $T_{int}$ and readout period $T_{rd}$ for all the photodetectors in the cluster is identical, then for sub-cycle time T, $$T_A = T_B = T_C = T_D \tag{9}$$

and the entire image sensor sampling/readout cycle T is:

$$T = 4 \times T_A \tag{10}$$

By substituting equation (10) into equation (8), it is found out that per photodetector, the maximum individual integration sub-cycle $T_{int-max-individual}$ is $$T_{int-max-individual} = \frac{T}{4} - T_{rd} \tag{11}$$

and the maximum dual integration sub-cycle $T_{int-dual}$ per photodetector is more than doubled in comparison to the maximum individual integration sub-period $T_{int}$.

$$T_{int-max-dual} = \frac{T}{2} - T_{rd} \tag{12}$$

By evaluating equation (4), it is noted that when going from individual sub-cycles to dual sub-cycles, the signal-to-noise ratio improves as a square root of the integration time, and the photocurrent signal is doubled. If equation (4) and (12) are solved, and the signal-to-noise ratio for dual sub-cycles is solved for then:

$$\left(\frac{S}{N}\right)_{dual} = 2 \times \sqrt{\frac{\frac{T}{2} - T_{rd}}{\frac{T}{4} - T_{rd}}} \times \left(\frac{S}{N}\right)_{individual} \tag{13}$$

When all the four-photodetector currents $I_{ph}$ are summed up simultaneously on the integration capacitor the result is half the resolution in the horizontal direction, as well as in the vertical direction. However, the signal-to-noise ratio is greatly improved, as following $$\left(\frac{S}{N}\right)_{all-combined} = 4 \times \sqrt{\frac{\frac{T}{2} - T_{rd}}{\frac{T}{4} - T_{rd}}} \times \left(\frac{S}{N}\right)_{individual} \quad (14)$$

Example 1: If T=33.33 msec, $T_{rd}$=4 msec, the dual signal-to-noise ratio is 3.4 times better than the individual signal-to-noise ratio.

Example 2: If T=33.33 msec and $T_{rd}$=4 msec, the signal-to-noise ratio for all the photodetectors summed up simultaneously if 10.4 times better than for the instance where it is done on an Individual basis.

What is claimed is:

1. A plurality of multi-cell clusters adaptable for use in an imaging sensor, each cluster of said multi-cell clusters comprising:
   a plurality of light detecting unit cells, each of said unit cells is configured to produce charge representative of light incident thereupon; and
   a circuit comprising a single storage device shared by said plurality of unit cells, said circuit is configured to accumulate in generally real-time the charge from any selected combination of unit cells of the cluster and to read-out said charge for controlling the resolution and the signal to noise ratio of said imaging sensor.

2. The plurality of multi-cell clusters according to claim 1, wherein each cluster of said plurality of multi-cell clusters comprises a plurality of switches, each switch of said plurality of switches is associated with a unit cell of said plurality of unit cells, each switch of said plurality of switches is configured to connect its associated unit cell to said circuit, each switch is configured to be controlled in a time-multiplexing manner.

3. The plurality of multi-cell clusters according to claim 1, wherein each unit cell of said plurality of unit cells comprises a light sensing device selected from the group consisting of a photodetector, a photodiode, and a photogate.

4. The plurality of multi-cell clusters according to claim 1, wherein said circuit also comprises a shared reset circuit.

5. The plurality of multi-cell clusters according to claim 1, wherein said circuit also comprises a shared readout circuit.

6. A sensing array comprising:
   a multiplicity of clusters, each cluster of said clusters comprising:
      a two-dimensional plurality of unit cells for detecting light and producing charge representative of said light; and
      a circuit comprising a single storage device shared exclusively by said plurality of unit cells of said cluster, said circuit is configured to control an integration cycle of said unit cells, and to accumulate in generally real-time the charge from any selected combination of unit cells of said cluster and to read-out said charge for controlling the resolution and the signal to noise ratio of said sensing array;
   a plurality of read-row lines, each read-row line is operatively connected to a row of clusters, for reading the accumulated charge of each cluster in said row of clusters; and
   a plurality of column sensing lines, each column sensing line is operatively connected to a column of said clusters, for sensing the sampled charge present in each of the clusters of said column.

7. The array according to claim 6, wherein said plurality of read-row lines and said plurality of column sensing lines are configured to carry programming signals for controlling said plurality of unit cells.

8. A method for operating an image sensor having a plurality of clusters, each cluster of said plurality of clusters comprises a two-dimensional plurality of unit cells for detecting light and producing charge representative of said light and a circuit comprising a single storage device operatively coupled to said plurality of unit cells of said cluster, said circuit is configured to control an integration cycle of said unit cells and to accumulate in generally real-time the charge from any selected combination of unit cells of said cluster and to read-out said charge for controlling the resolution and the signal to noise ratio of said sensing array, the method comprising the steps of:
   exposing said image sensor to light at least for the duration of said integrating cycle;
   coatrollably summing, during said integrating cycle, the charge from at least one selected combination of the unit cells included in the cluster to store in said circuit at least one summed charge; and
   reading out said at least one summed charge within the duration of said integrating cycle.

9. The method according to claim 8, wherein one or more unit cells of said plurality of unit cells are preprogrammed unit cells.

10. The method according to claim 8, wherein the step of reading out comprises reading out said at least one summed charge in real time.

11. The method according to claim 8, wherein said step of controllably summing comprises sequentially summing within two or more sub-cycles of said integrating cycle, the charge from two or more selected combinations of the unit cells included in the cluster to sequentially store in said circuit two or more summed charges, each charge of said two or more summed charges represents the total charge simultaneously summed from all unit cells included within a single combination of said two or more selected combinations.

12. The method according to claim 8, wherein said step of controllably summing comprises the step of summing the charge from each unit cell within a cluster separately and sequentially within Sub-cycles of said integrating cycle.

13. The method according to claim 8, wherein said step of controllably summing comprises the step of substantially simultaneously summing charge from two or more of said unit cells of the same cluster within said integrating cycle.

14. The method according to claim 8, wherein said step of controllably summing comprises the step of substantially simultaneously summing the charge from all of the unit cells in a cluster within said integrating cycle.

15. The method according to claim 8, wherein said steps of controllably summing and reading out are performed for all clusters of said plurality of clusters, and further comprising the step of combining all of the summed charges read out from all of said clusters within said integrating cycle into a single image.

16. The method according to claim 8, further comprising the step of dynamically controlling the resolution and the signal to noise ratio of said sensing array by dynamically controlling one or more of,
   the number of unit cells in said at least one selected combination of unit cells,
   the spatial arrangement of unit cells in said at least one selected combination of unit cells, and
   the number and the spatial arrangement of unit cells in said at least one selected combination of unit cells.

17. The method according to claim 16, wherein said step of dynamically controlling comprises the step of determining the number or the spatial arrangement, or the number and the spatial arrangement of unit cells in said at least one selected combination of said step of controllably summing, depending on light conditions.

18. The method according to claim 16, wherein said steps of exposing, controllably summing, and dynamically controlling are performed in generally real-time.

19. The method according to claim 8, further comprising the step of improving the signal to noise ratio of said image sensor by increasing the number of the unit cells in said at least one selected combination.

20. The method according to claim 8, further comprising the step of:

improving the resolution of said image sensor by decreasing the number of unit cells in each selected combination of said at least one selected combination; and reading within said integrating cycle the summed charges of said at least one summed charge of a cluster separately in a time-multiplexing manner.

21. The plurality of multi-cell clusters according to claim 1, wherein said storage device is implemented in the focal plane of said imaging sensor for accumulating said charge.

22. A plurality of multi-cell clusters adaptable for use in an imaging sensor, each cluster of said multi-cell clusters comprising:

a two-dimensional plurality of light detecting unit cells, each of said unit cells is configured to produce charge representative of light incident thereupon; and a circuit configured to accumulate and to read-out charge in generally real-time from one or more of said unit cells, said circuit comprises a single storage device controllably and simultaneously connectable to any desired combination of said unit cells, said circuit is configured to allow simultaneously accumulating the charge from any desired combination of unit cells within the cluster.

23. A sensing array comprising:

a multiplicity of clusters, each cluster of said clusters comprising:

a two-dimensional plurality of unit cells for detecting light and producing charge representative of said light; and a circuit shared exclusively by said plurality of unit cells of said cluster, said circuit is configured to control an integration cycle of said unit cells, and to accumulate said charge, said circuit comprises a single storage device controllably connectable to any desired combination of said unit cells, said circuit is configured to allow simultaneously accumulating the charge from any desired combination of unit cells within the cluster;

a plurality of read-row lines, each read-row line is operatively connected to a row of clusters, for reading the accumulated charge of each cluster in said row of clusters; and a plurality of column sensing lines, each column sensing line is operatively connected to a column of said clusters for sensing the sampled charge present in each of the clusters of said column.

24. A method for operating an image sensor having a plurality of clusters, each cluster of said plurality of clusters comprises a two-dimensional plurality of unit cells for detecting light and producing charge representative of said light and a circuit comprising a single storage device operatively coupled to said plurality of unit cells of said cluster, said circuit is configured to control an integration cycle of said unit cells and to controllably accumulate charge from one or more of the unit cells of said cluster, the method comprising the steps of:

exposing at least part of said image sensor to light;

controllably selecting a desired combination of unit cells from the plurality of unit cells included in a cluster, wherein said desired combination is selectable from all the combinations of unit cells possible for said cluster;

simultaneously summing in said circuit the charge from the unit cells included in said desired combination of unit cells selected in said step of controllably selecting to store in said circuit a summed charge; and reading out said summed charge.

* * * * *